W. E. MAYER.
DEVICE TO PROTECT FRUIT TREES FROM FROST.
APPLICATION FILED JULY 17, 1913.
1,095,015.
Patented Apr. 28, 1914.
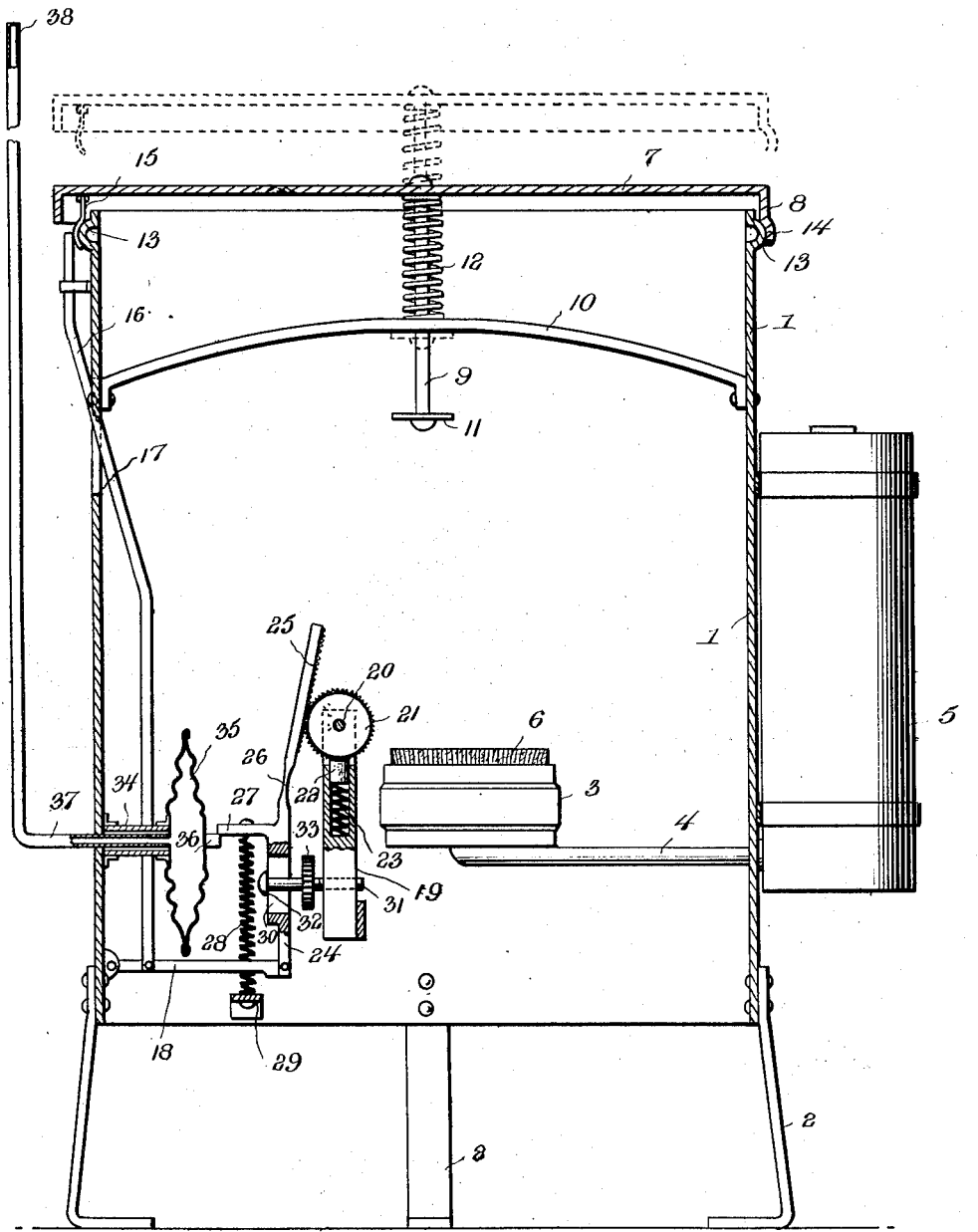
Inventor
William E. Mayer.
Witnesses
W. Smith
Mury Bagger
By Victor J. Evans
Attorney

UNITED STATES PATENT OFFICE.

WILLIAM E. MAYER, OF PITTSBURGH, PENNSYLVANIA, ASSIGNOR OF ONE-HALF TO CHARLES E. EAGAN, OF PITTSBURGH, PENNSYLVANIA.

DEVICE TO PROTECT FRUIT-TREES FROM FROST.

1,095,015.　　　　Specification of Letters Patent.　　Patented Apr. 28, 1914.

Application filed July 17, 1913. Serial No. 779,565.

*To all whom it may concern:*

Be it known that I, WILLIAM E. MAYER, a citizen of the United States, residing at Pittsburgh, in the county of Allegheny and State of Pennsylvania, have invented new and useful Improvements in Devices to Protect Fruit-Trees from Frost, of which the following is a specification.

This invention relates to devices for protecting plants and especially fruit trees from frost during the spring season while blossoms and buds are developing, and it has particular reference to a heating device which is thermally operated when the temperature falls below a predetermined point to ignite a burner and to release a protecting lid or cover, thereby causing heated air to ascend.

One object of the invention is to produce a device embodying a burner arranged within a casing, the latter having a movably supported lid, means being provided for igniting the burner, and means including a thermostat being provided for actuating the igniter at a predetermined temperature.

A further object of the invention is to provide a burner containing casing having a spring-actuated obstructing lid, latch means for holding the lid in obstructing position against the tension of the actuating spring, and thermostatic means for actuating the latch to release the cover at a predetermined temperature.

A further object of the invention is to produce a burner containing casing having a spring-actuated lid which when released constitutes a deflector for spreading the ascending heated air.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, the single figure represents a sectional elevation of a device constructed in accordance with the invention.

A casing 1 constructed of sheet metal or other suitable material and preferably of cylindrical shape is provided with legs 2, whereby it may be supported above the ground. The casing contains a burner 3 having a feed pipe 4 connected with a fuel reservoir 5 which has been shown as being supported on the outside of the wall of the casing. The burner, which may be of any desired construction, has been shown as being provided with a wick 6. Any well known means may be used for controlling the flow of liquid fuel from the reservoir to the burner.

The casing is provided with a lid 7 having a depending annular flange 8. The lid has a depending rod 9 guided through an aperture in a cross bar 10 within the casing and provided at its lower end with a stop member 11 to limit the upward movement of the lid under the tension of the spring 12 which is coiled about the rod 9 between the lid and the cross bar 10. The casing 1 is provided near its upper edge at diametrically opposite sides with struck-up lugs 13, one of which is adapted to engage a corresponding depression 14 in the flange 8 of the lid, the other lug being adapted to be engaged by a pivoted latch member 15 connected with the underside of the lid and having a depression which engages the lug 13. A latch bolt consisting of a bar 16 is provided, said bar operating through a slot 17 in the casing 1 and being connected at its lower end with a lever 18 fulcrumed interiorly on the wall of the casing. It will be seen that when the lid is depressed against the tension of the spring 12 and is placed in obstructing position on the top of the casing, the upper end of the bolt 16 may be introduced between the flange 8 and the latch member 15, thus causing said latch member to be held in engagement with one of the lugs 13 while the recess or depression 14 in the flange of the lid is similarly held in engagement with the lug 13 at the diametrically opposite side of the casing, and thus holding the lid securely against the tension of the spring.

An igniter is provided which includes a tubular casing 19 supported adjacent to the burner and provided at its upper end with bearings supporting a stem or shaft 20 carrying a toothed wheel 21, the serrated rim of which engages a block of substance 22 which when subjected to friction will produce a spark, said substance being accommodated within the casing 19 where it is forced in the direction of the serrated wheel by the action of a spring 23. Connected pivotally with the lever 18 is a bar 24 having at its upper end a toothed portion 25 meshing with the wheel 21, said toothed portion being connected with the lower end of the bar by an intermediate resilient portion 26, whereby the upper toothed portion is maintained in engagement with the wheel 21 in various positions of the bar. The bar 24 has a laterally extending bracket 27 constituting a trigger, said bracket being connected with the upper end of a spring 28, the lower end of which is made fast at 29. The bar 24 has a slot 30 for the passage of the bolt 31 which is in threaded engagement with the casing member 19 and which has a head 32, whereby the bar may be drawn in the direction of the casing. The bolt 31 may be provided with a hand wheel 33, whereby it may be conveniently rotated.

A sleeve 34 secured interiorly on the wall of the casing 1 supports a thermostat casing 35, the side members of which are corrugated, as shown, and one side member of which carries a lug or stud 36 disposed in the path of the trigger member 27. The other side member of the casing 35 is connected with one end of a metallic tube 37 of small diameter which extends through the sleeve 34 and through the wall of the casing, said tube being conducted upwardly or in any direction for any desired distance, the outer extremity of the tube being sealed, as indicated at 38.

The air within the tube 37 and the casing 35 being expanded by heat, will obviously keep the casing 35 in a relatively expanded condition at a high temperature and in a relatively contracted condition at a low temperature; such being the case, and the degree of expansion of the thermostat casing at various temperatures being known or ascertained by experiment, it will be readily seen that the supporting lug 36 shall be withdrawn from beneath the trigger member 27 at a predetermined temperature, usually somewhere in the neighborhood of the freezing point. The point at which such disengagement shall occur may, however, be very accurately regulated by proper adjustment of the screw or bolt 31, whereby the bar 24 carrying the bracket or trigger member 27 may be moved away from the supporting lug. When the trigger member 27 is thus retracted with respect to the supporting lug 36, it is obvious that the spring portion 26 of the bar 24 is placed under tension, so that when the screw is rotated in the opposite direction, the trigger member will be forced in the direction of the supporting lug 36 by the action of the spring 26. Very accurate adjustment may thus be made to cause the trigger 27 to be released at any predetermined temperature. It will be seen that the spring 26 also serves to maintain the rack bar 25 in engagement with the toothed wheel 21 in various positions of said rack bar. Now, when the trigger member 27 is released from engagement with the lug 36, the tension of the spring 28 will pull the trigger member with the bar 24, whereby it is supported in a downward direction, thus causing the wheel 21 to be rotated by the action of the rack bar and in contact with the friction member 22, thus striking a spark and igniting the burner. At the same time, the lever 18 will be actuated by the bar 24, thereby moving the latch bolt 16 downward and out of engagement with the latch member 15, thus releasing the lid which is now forced in an upward direction by the spring 12. The casing being supported at a suitable elevation to permit air to enter the lower portion thereof, it is obvious that the air within the casing being heated will ascend and pass through the annular opening between the lid and the upper edge of the casing, being deflected in all directions so that a considerable area will be affected thereby.

The improved devices may be placed at suitable intervals beneath fruit trees or other plants which are liable to be injuriously affected by frost. By properly setting the trigger device 27 with respect to the supporting lug 32, the devices will be thermally actuated at a predetermined temperature to ignite the burners and to release the lids, as described.

While a simple and preferred form of thermostat, actuated by expansion and contraction of air, has herein been shown, it is desired to be understood that no limitation is intended in this respect. Thus, the thermostat might be equipped with some fluid other than air, but particularly sensitive to heat and cold, or a thermostat might be employed, depending for its operation on the contraction and expansion of metal. The right to changes and modifications of this character is reserved.

Having thus described the invention, what is claimed as new, is:—

1. In a device of the class described, a burner casing, a spring actuated lid, vertically guided supporting means for said lid, latch means to secure the lid in obstructing position, and thermally actuated means to release the latch.

2. In a device of the class described, a burner casing, a lid for the casing, means for bodily projecting said lid upwardly from the casing to constitute a deflector, latch means for holding the lid in retracted position, and means for releasing the latch.

3. In a device of the class described, a burner casing, a lid for the same, spring means for projecting the lid upwardly from the casing to constitute a deflector, and vertically guided supporting means for the lid.

4. In a device of the class described, a casing containing a burner, and thermally actuated igniting means for said burner including a serrated wheel, a friction block engaged thereby, and a spring actuated rack bar engaging the serrated wheel.

5. In a device of the class described, a casing containing a burner, and igniting means for said burner including a serrated wheel, a spring actuated friction member engaged thereby, a spring actuated rack bar engaging the serrated wheel, trigger means for supporting the rack bar against the tension of its actuating spring, and thermostatic trigger actuating means to release the rack bar.

6. In a device of the class described, a casing, a burner within the casing, igniting means for the burner, a spring projected lid for the casing, vertically guided supporting means for the lid, latch means for securing the lid in retracted position, latch releasing means, and thermostatic means for simultaneously actuating the igniting device and the latch releasing means.

7. In a device of the class described, a casing containing a burner, and a thermally actuated igniting device, said igniting device including a serrated wheel, a friction member engaged thereby, a spring actuated rack bar engaging the serrated wheel and including a resilient portion whereby the rack portion is maintained in engagement with the wheel in various positions of the rack bar, a bracket associated with the rack bar and constituting a trigger, and thermally actuated supporting means for the trigger.

8. In a device of the class described, a burner, and igniting means for the same including a serrated wheel, a friction member engaging the same, a lever, a rack bar pivotally connected with the lever and engaging the serrated wheel, said bar including a resilient portion whereby its toothed portion is maintained in engagement with the wheel in various positions of the bar, means for forcing the rack bar in the direction of the wheel, a trigger associated with the rack bar, spring means for actuating the latter, and thermally actuated trigger supporting means.

9. In a device of the class described, a casing containing a burner, a lever fulcrumed in the casing, a movably supported spring actuated lid, latch means for securing the lid in obstructing position, said latch means including a slidable releasing bolt connected with the lever, an igniting device including a serrated wheel, a bar connected pivotally with the lever, said bar having a toothed portion and a resilient portion whereby the toothed portion is maintained in engagement with the wheel, means for forcing the rack bar in the direction of the wheel, a trigger member associated with the rack bar, spring means for actuating the rack bar, and thermally actuated trigger supporting means.

In testimony whereof I affix my signature in presence of two witnesses.

WILLIAM E. MAYER.

Witnesses:
WM. B. BAGGER,
BENNETT S. JONES.